J. M. DODGE.
PIVOT PIN FOR CHAINS.
APPLICATION FILED MAR. 2, 1909.
993,969.
Patented May 30, 1911.
Fig. 1.
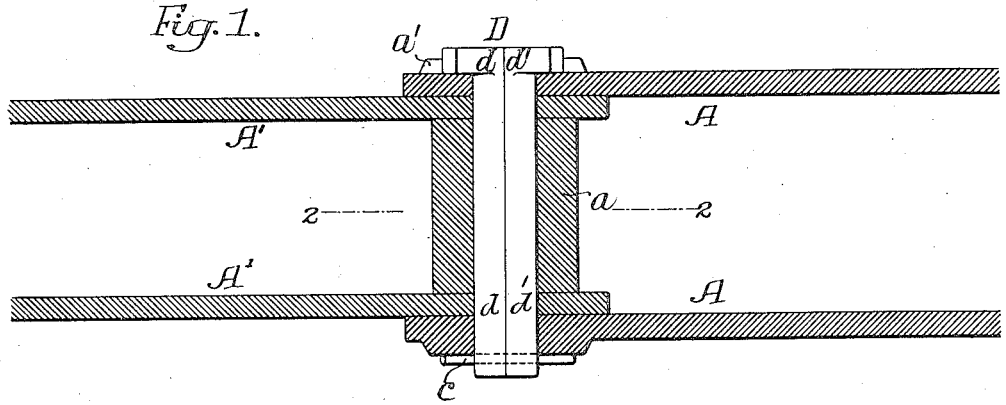
Fig. 2.
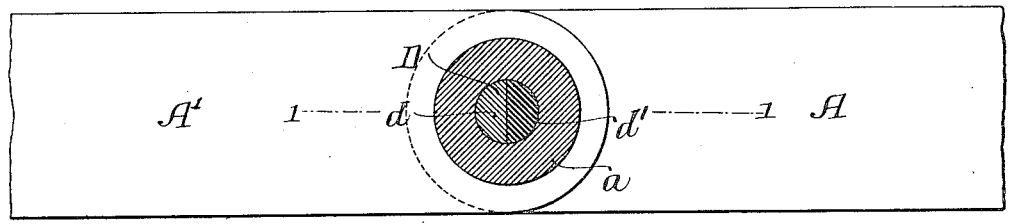
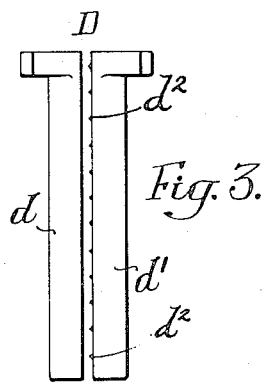
Fig. 3.
Witnesses:—
Walter Chisni
Wills A. Burrowes
Inventor:—
James M. Dodge.
by his Attorneys:—
Howson & Howson

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

PIVOT-PIN FOR CHAINS.

993,969.

Specification of Letters Patent.   Patented May 30, 1911.

Application filed March 2, 1909.   Serial No. 480,981.

*To all whom it may concern:*

Be it known that I, JAMES M. DODGE, a citizen of the United States, residing in Philadelphia, Pennsylvania, have invented certain Improvements in Pivot-Pins for Chains, of which the following is a specification.

My invention relates to certain improvements in pivot pins connecting the links of drive chains.

The object of my invention is to make one section of the pin harder than the other; the hardened section taking the strain of the pull upon the drive chain. This object I attain by making the pin in two parts connected together by welding or other means.

In the accompanying drawings:—Figure 1, is a longitudinal sectional view on the line 1—1 Fig. 2; showing two links of a drive chain connected by my improved pin; Fig. 2, is a longitudinal sectional view on the line 2—2, Fig. 1; Fig. 3, is a view showing the two parts of the pin detached, and Fig. 4, is a view of a modification.

A, A' are the links of a chain; the links A' being connected by an intervening member $a$, this intervening member is preferably united to the links A' by welding, although it may be united in any suitable manner, or may be loose in some instances.

D is a pivot pin extending through openings in the several link sections A, A', and, in the present instance, this pin is prevented from turning in the link sections A by flanges $a'$ and is held in place on the opposite side of the chain by a cotter pin $c$, or other suitable fastening, so that the link sections A' with the connecting member $a$ turn on the pin. Chains of this type are used for driving purposes, or in connection with conveying mechanism, and the wear is usually upon one side of the pin, that is, between the pin and the link sections A', and in order to make a substantial pin having a hard bearing surface, I make the pin in two sections $d$, $d'$ as indicated in Fig. 3, and these two sections are secured together, preferably by welding. In the present instance I have shown projections $d^2$ on one section of the pin so that the two parts can be electrically welded by what is known as the spot welding process, although it will be understood that any suitable welding process may be used to connect the sections of the pin together.

While I preferably make the pin in two sections, including the head as well as the body portion, in some instances the pin may be made as shown in Fig. 4, in which the head is made integral with one section $d^3$ and the wearing section $d^4$ may be inserted in a recess in the section $d^3$ and welded thereto. As the wear in this type of chain is at one side of the pin only, it will be seen that by making this side harder than the other, it will resist the wear at the same time the other side will give the pin the desired strength to resist the shocks and side strains to which it is subjected.

I claim:—

An integral pin for chains having two longitudinal sections, one section being harder than the other and each section having a head.

In testimony whereof, I have signed my name to this specification, in the presence of two subscribing witnesses.

JAMES M. DODGE.

Witnesses:
   WM. E. SHUPP,
   WM. A. BARR.